United States Patent
Palkus et al.

(10) Patent No.: US 12,123,312 B2
(45) Date of Patent: Oct. 22, 2024

(54) TURBINE MODULE FOR A TURBOMACHINE

(71) Applicant: MTU Aero Engines AG, Munich (DE)

(72) Inventors: Kacper Palkus, Tarnobrzeg (PL); Roman Schmierer, Todtenweis (DE); Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/866,512

(22) Filed: Jul. 17, 2022

(65) Prior Publication Data

US 2023/0029124 A1    Jan. 26, 2023

(30) Foreign Application Priority Data

Jul. 21, 2021 (EP) ...................................... 21187063

(51) Int. Cl.
*F01D 17/10*      (2006.01)
*F01D 11/14*      (2006.01)

(52) U.S. Cl.
CPC ............ *F01D 17/105* (2013.01); *F01D 11/14* (2013.01); *F05D 2220/323* (2013.01); *F05D 2260/606* (2013.01)

(58) Field of Classification Search
CPC .......... F01D 17/105; F01D 11/14; F01D 9/04; F01D 25/122; F01D 9/041; F01D 9/06; F04D 29/08; F05D 2220/323; F05D 2260/606; F05D 2240/121; F05D 2240/122; F05D 2240/126; Y02T 50/60
See application file for complete search history.

(56) References Cited

U.S. PATENT DOCUMENTS

| | | | |
|---|---|---|---|
| 4,025,226 A * | 5/1977 | Hovan | F01D 5/186 415/115 |
| 4,752,185 A * | 6/1988 | Butler | F01D 11/10 415/175 |
| 10,378,372 B2 | 8/2019 | Negulescu et al. | |
| 10,526,906 B2 | 1/2020 | Nguyen et al. | |
| 2007/0110563 A1* | 5/2007 | Janke | F01D 11/08 415/115 |
| 2016/0208631 A1 | 7/2016 | Spangler et al. | |
| 2016/0312654 A1 | 10/2016 | Chakka et al. | |
| 2017/0022836 A1* | 1/2017 | Negulescu | F01D 5/187 |
| 2017/0362941 A1 | 12/2017 | Graig, III | |

(Continued)

FOREIGN PATENT DOCUMENTS

| | | |
|---|---|---|
| EP | 3121371 B1 | 10/2020 |
| KR | 102153065 B1 | 9/2020 |

*Primary Examiner* — Woody A Lee, Jr.
*Assistant Examiner* — Eric A Lange
(74) *Attorney, Agent, or Firm* — Davidson Kappel LLC

(57) ABSTRACT

A turbine module (2) for a turbomachine (1). The turbine module (2) includes a main channel (26) to guide a main flow (36) through the turbine module (2), a rotor blade (21) and a stator vane (22), the stator vane (22) including a stator airfoil (22) and a platform (23), with the stator airfoil (22) arranged downstream of the rotor blade (21) in the main channel (26), and a cavity (30) including an inlet (31) for injecting a part (36.2) of the main flow (36) into the cavity (30), an outlet (32) for a reinjection of the part (36.2) of the main flow (36) from the cavity (30) into the main channel (26), wherein the cavity (30) is arranged at an axial position of the stator vane (20) and is radially offset from the stator airfoil (22).

19 Claims, 3 Drawing Sheets

(56) References Cited

U.S. PATENT DOCUMENTS

2018/0291763 A1* 10/2018 Pitt .................... F01D 9/023
2019/0107006 A1  4/2019 Propheter-Hinckley
2019/0331000 A1* 10/2019 Klingels ............ F01D 11/06
2020/0190995 A1  6/2020 Perron et al.

* cited by examiner

TURBINE MODULE FOR A TURBOMACHINE

This claims the benefit of European Patent Application EP 21187063.9, filed on Jul. 21, 2021, which is hereby incorporated by reference herein.

Technical Area

The present invention relates to a turbine module for a turbomachine.

BACKGROUND

Applications of turbomachines can be found in jet engines, e.g. turbofan engines. Functionally, the turbomachine is divided into a compressor, combustion chamber and turbine. In the case of the jet engine, for example, air that is sucked in is compressed by the compressor and burned in the combustion chamber located downstream with the added kerosene. The resulting hot gas, a mixture of combustion gas and air, flows through the turbine located downstream and is expanded in this process. The turbine extracts some of the energy from the hot gas in order to drive the compressor.

The present application is directed to the turbine or a module thereof; however, it shall not be limited to the jet engine used for illustration purposes; it is also possible, for example, to use it in a stationary gas turbine.

SUMMARY OF THE INVENTION

It is an object of the present application to provide an advantageous turbine module.

The present invention provides a turbine module (2) for a turbomachine (1). The he turbine module (2) comprises a main channel (26) to guide a main flow (36) through the turbine module (2), a rotor blade (21) and a stator vane (22), the stator vane (22) comprising a stator airfoil (22) and a platform (23), with the stator airfoil (22) arranged downstream of the rotor blade (21) in the main channel (26), and a cavity (30) comprising i. an inlet (31) for injecting a part (36.2) of the main flow (36) into the cavity (30), ii. an outlet (32) for a reinjection of the part (36.2) of the main flow (36) from the cavity (30) into the main channel (26), wherein the cavity (30) is arranged at an axial position of the stator vane (20) and is radially offset from the stator airfoil (22).

A main flow through a main channel of the turbine module can possess flow regions of higher losses due to the presence of secondary flows, for example due to tip clearance losses of a rotating rotor blade in a rotor passage. Flow disturbances starting in the rotor passage can propagate in a, in particular adjacent, stator passage downstream and disturb the inlet flow of a stator vane. A basic idea of the invention is to bleed a part of the main flow, particularly from a flow region of higher losses, away into a cavity and advantageously reinject this flow back into the main channel at a downstream location. In simple words, at least a portion of the airfoil of the downstream, in particular adjacent, stator vane is bypassed, e.g. at least its leading edge.

For this purpose, the cavity is arranged at an axial position of the stator vane and radially offset from the stator airfoil. In particular, the cavity can be arranged radially outside of the outer shroud or platform of the stator vane. It comprises an inlet to bleed a part of the main flow into the cavity and an outlet to reinject the flow from the cavity into the main channel. The reinjection can for instance enable the flow characteristics of the main flow to be influenced. It can also energize a boundary layer and for example prevent a flow separation in the main channel, improve the circumferential mixing of secondary flows and mitigate a passage vortex, for example, in the stator passage.

Preferred embodiments can be found in the entire disclosure, wherein in the description of the features, a distinction is not always made in detail between device and method or use aspects; the disclosure is to be read implicitly with regard to all claim categories. If, for example, an advantage of the module is described in a specific application, this is to be understood at the same time as a disclosure of a corresponding use.

The main channel is a fluid channel extending axially through the rotor passage, which comprises the rotor blade, and through the stator passage located downstream of the rotor passage, in which the stator airfoil is arranged. The main flow is the hot gas flow discussed above, it can for instance contribute to the thermodynamic cycle of a turbomachine. The rotor blade can for instance belong to a segment with a plurality of blades, it can particularly be a part of a blade ring forming a rotor stage. Generally, a rotor blade can comprise an airfoil, a root and a platform comprising an inner endwall arranged radially inward.

The same applies to the terminology of the stator vane. It can comprise the stator airfoil and a platform, e.g. an inner and an outer platform. The inner platform is arranged radially inward, whereas the outer platform is arranged radially outward with regard to the main channel. The platforms can comprise or connect to vane hooks and include corresponding endwalls, i.e. the inner platform can comprise an inner endwall and the other platform can comprise an outer endwall. The inner endwall can in particular be a hub endwall. The inner and outer endwalls radially delimit the stator passage of the main channel.

The cavity can be spatially separated from the main channel, it can for example be located outside of the main channel. The position of the cavity, radially offset from the stator airfoil, can particularly be radially offset to the outside of the stator airfoil, e.g. beyond the outer endwall of the stator vane. In general, however, it can also be arranged radially inward of the inner endwall of the stator vane. The cavity can for instance have a larger axial extension than the stator airfoil. It can for example be part of a vane hook chamber, which vane hooks typically extend axially beyond the stator airfoil and can axially delimit the cavity.

In a preferred embodiment, at least the part of the main flow guided into the cavity is bled from a region radially to the outside of the main channel near the tip of the rotor blade, it can in particular be a leakage flow of the rotor blade, e.g. a tip-leakage flow over the blade shroud. In particular, the tip-leakage flow may correspond to a tip clearance losses and/or can (hence) be a flow at the tip of the rotor blade adjacent to the stator vane on the upstream side between the blade tip and a radially surrounding and/or adjacent stator wall and/or static seal. The leakage flow can result in a tip vortex flow and can further develop in the main channel downstream. It can for instance disturb the main flow and interact with a passage vortex in the stator passage, decreasing the efficiency of the turbine. Bleeding the leakage flow away from the main flow can therefore mitigate the harmful effects of these secondary flows in the main channel.

According to a preferred embodiment, the inlet is arranged upstream of the stator airfoil, and preferably downstream of the rotor blade, at a wall surface radially delimiting the main channel. The inlet can comprise a plurality of flow guiding elements, especially in the shape of holes or slots to bleed fluid from the main flow. These flow guiding elements can be configured to minimise pressure losses while transporting as much of the leakage flow as required. In general, the wall surface with the inlet can be an inner wall surface of a casing radially delimiting the main channel of the rotor passage outwards. In particular, the wall surface is formed by the platform of the stator vane, for example the outer endwall defining the main channel radially outwards. According to a preferred embodiment, the outlet is arranged at a minimum 20%, in the increasing order of preference, at a minimum 30%, 40%, or 50% of an axial chord length of the stator airfoil, e.g. near the throat of the stator vane. Therein, 0% axial chord length indicates the leading edge position of the stator airfoil and 100% axial chord length indicates the trailing edge position of the stator airfoil, the axial chord length taken at the respective wall surface of the platform. The rear axial portion of the stator vane, in particular, the throat region, can have a lower pressure which can be advantageous when the flow is reinjected from the cavity into the main flow at this position. Furthermore, the outlet is preferably arranged at a maximum 99%, in the increasing order of preference, at a maximum 95%, 90%, 80% or 70% of the axial chord length.

According to a preferred embodiment, the outlet comprises flow guiding elements, in particular inclined holes or slots, for guiding the flow reinjected from the cavity into the main channel. The flow guiding elements can generally be arranged in an endwall of the respective platform, e.g. in the outer platform. The holes or slots can be manufactured using a material-removing process, e.g. drilling or cutting. Alternatively, the holes or slots can be integrally formed with the endwall. The holes or slots can also comprise or be defined by a deflector, e.g. a step in the local surface of the platform or endwall, which step is for instance integrally formed with the platform. Generally, the inclination of the holes or slots for example can result in a direction of the reinjected flow basically tangential to the local main flow at the position of reinjection. Increasing the tangential velocity component of the reinjected flow relative to the local main fluid flow can help reduce pressure losses in the stator passage.

In a preferred embodiment, a middle axis of a respective outlet hole or slot forms an angle of less than 60°, in the increasing order of preference less than 50°, 40°, 30° or 20° with the wall surface. Lower limits can for instance be 5° or 10°. The angle considered here is always the acute angle. Without being bled into the cavity, the tip leakage flow could, depending on the specific design, for instance have an angular deviation from the main flow of around 65° in the radial direction. By bleeding and reinjecting it through inclined holes or slots, this deviation can be reduced.

Alternatively or in addition, the inclined holes or slots can be inclined in the circumferential direction to correspond to the local flow in the main channel. The flow reinjected into the main channel is preferably guided towards the pressure side of the stator vane. The interaction of this reinjected flow with the main flow can for instance weaken or mitigate the effects of the passage vortex.

According to a preferred embodiment, an outlet opening is arranged in the stator airfoil. The stator airfoil can comprise an air passage for guiding a flow from the cavity to the outlet opening in the stator airfoil. The outlet opening in the stator airfoil can be located at the pressure and/or the suction side of the airfoil, preferably in the throat region of the stator passage. The outlet opening in the airfoil can be an alternative or can be combined with an opening in the endwall (see above), the reinjection of the flow from the cavity into the main channel can for example either take place in the outer endwall or in the stator airfoil or both.

In a preferred embodiment, a heat shield element is provided and radially delimits the cavity. It can prevent the hot fluid bled into the cavity from being further transported outside the fluid path into the engine structure. At the same time, the heat shield element can reduce thermal transmissions from the fluid to the engine structure, for example, to a casing of the turbine module, and hence prevent overheating.

According to a preferred embodiment, ribs for guiding the flow in the cavity are arranged therein, e.g. a plurality of symmetrical ribs translationally arranged, for instance in the circumferential direction. The ribs can preferably guide the flow in the cavity such that the circumferential angle of the velocity vector of the flow in the cavity is basically similar to that of the main flow upon reinjection. The flow bled into the cavity can have a different circumferential angle compared to the main flow, e.g. due to the flow characteristics of the leakage flow.

During work extraction in the rotor passage, the main flow is turned by the rotor blade, whereas the leakage flow is not subjected to the same turning. A resulting difference in circumferential angle can, depending on the specific design, for instance be around 75°. Apart from reducing the angular deviation, the ribs arranged in the cavity can also strengthen the hooks of the stator vane, potentially enabling the weight of the vane hook structure to be further optimized.

In a preferred embodiment, the cavity comprises an additional inlet for guiding an additional flow into the cavity, which additional flow is sourced externally outside the main flow of the turbine module. This additional flow can especially be a cooling flow bled from another section of the turbomachine, for example from a compressor. The additional flow can serve to influence the so-called blowing ratio of the reinjected flow by increasing the mass flow of the flow in the cavity. The additional flow can ensure that the mass flow reinjected is sufficiently high, which can for instance prevent a possible flow separation, e.g. in the outer diameter regions of the stator vane.

The invention also relates to a turbomachine with the turbine module disclosed here. The turbomachine can especially be a turbofan engine.

The invention also relates to a use of the turbomachine. Preferably, the turbomachine is used as an aircraft engine, in particular as a jet engine.

BRIEF DESCRIPTION OF THE DRAWINGS

The invention is explained in more detail below using an exemplary embodiment, with the individual features also being relevant to the invention in other combinations, and furthermore relating to all claim categories.

In Detail

DETAILED DESCRIPTION

Figure 1:
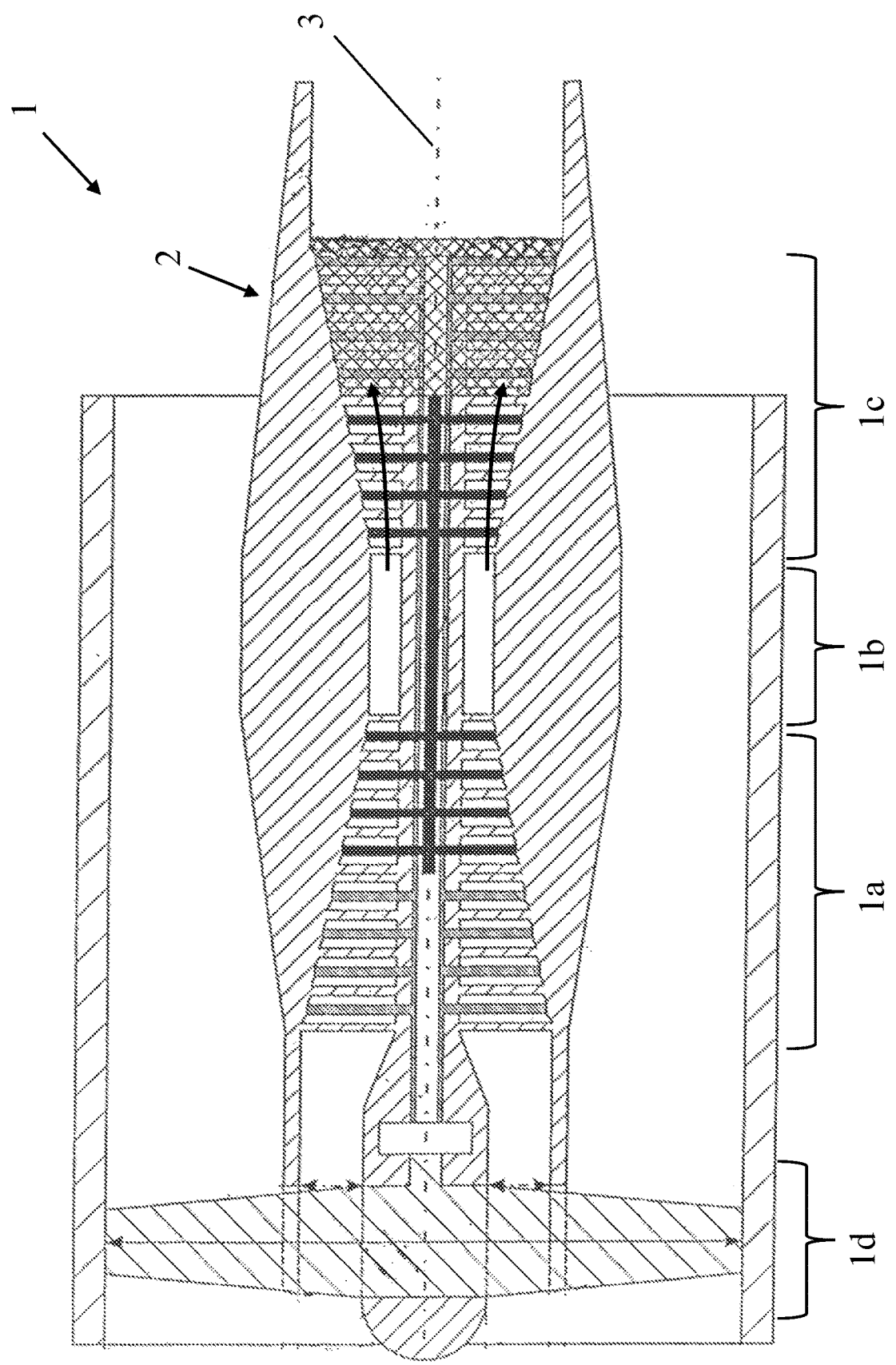
FIG. 1 shows a jet engine in an axial section.

FIG. 1 shows a turbomachine 1, specifically a turbofan engine, in an axial section. The turbomachine 1 is functionally divided into compressor 1*a*, combustion chamber 1*b*, turbine 1*c* and fan 1*d*. Both the compressor 1*a* and the turbine 1*c* are each made up of several stages, each stage comprising a stator vane ring and a rotor blade ring. During operation, the rotor blade rings rotate around the longitudinal axis 3 of the turbomachine 1, and air sucked in is compressed in the compressor 1a and then burned with kerosene in the combustion chamber 1b. The resulting hot gas is expanded in the turbine 1c and drives the rotor blade rings.

Figure 2:
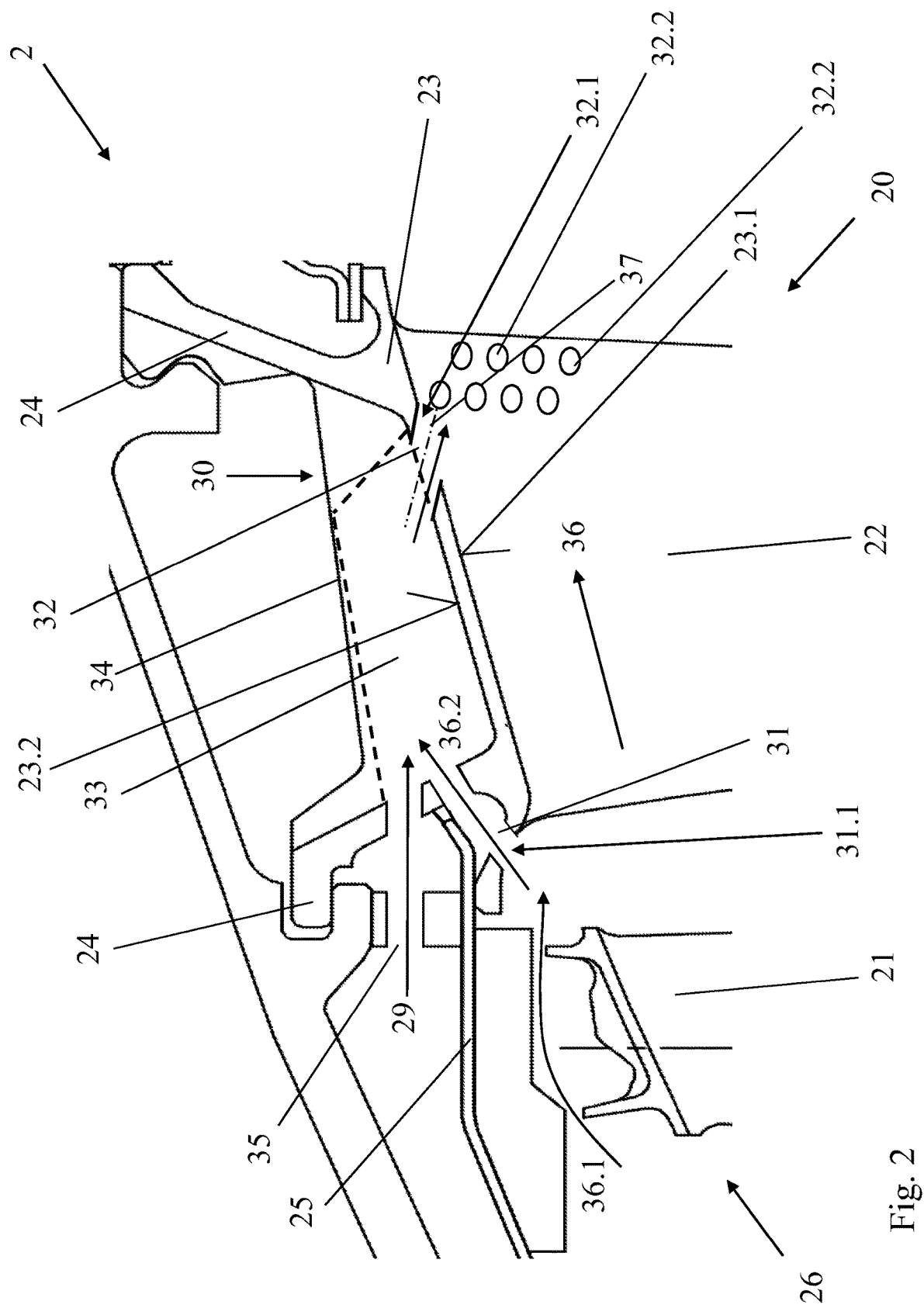
FIG. 2 shows a schematic representation of the turbine module according to the invention.

FIG. 2 shows a turbine module 2 of the turbine 1c in schematic representation. A main flow 36 is guided through a main channel 26 of the turbine module 2. In the main channel 26, a stator airfoil 22 is arranged downstream of a rotor blade 21. An inner wall 25 of the engine casing can also be seen, radially delimiting the rotor passage of the main channel 26 to the outside. The stator airfoil 22 belongs to a stator vane 20, which additionally comprises an outer platform 23.

A cavity 30 is arranged at an axial position of the stator vane 20, and radially offset to the outside of the stator airfoil 22. It is radially delimited by a wall surface 23.2 of the outer platform 23. The cavity comprises an inlet 31 with an opening 31.1 arranged upstream of the stator airfoil 22 and an outlet 32 with an opening 32.1 arranged downstream from the inlet 31 at a position between 50% to 70% of the axial chord length of the stator airfoil 22. Furthermore, openings 32.2 of the outlet 32 are arranged in the stator airfoil 22, guiding a flow reinjected from the cavity 30 into the main channel 26. In alternative embodiments not shown here, either the openings 32.1 or 32.2 can be omitted, resulting in a reinjection solely occurring through the outer platform 23 or the stator airfoil 22.

The vane hooks 24, as well as a heat shield element 34 can be seen bordering the cavity 30. The heat shield element 34 radially delimits the cavity 30 outwards. Additionally, ribs 33 are arranged in the cavity 30 (one rib is indicated in a side view by the hatched lines). The ribs 33 guide the flow inside the cavity, see in detail above. The cavity 30 furthermore comprises an additional inlet 35 for guiding an additional flow 29 from the compressor section 1a, which is an optional feature.

The rotating rotor blade 21 creates a tip-leakage flow 36.1, which could disturb the flow, see in detail above. To prevent such secondary flows, at least a part 36.2 of the main flow 36 is guided through the inlet 31 into the cavity 30. In particular, the tip-leakage flow 36.1 is bled into the cavity 30. Subsequently, it is reinjected via the outlet 32 comprising inclined holes 37 into the main channel 26. The reinjected flow possesses a relatively large tangential component relative to the main flow 36.

Figure 3:
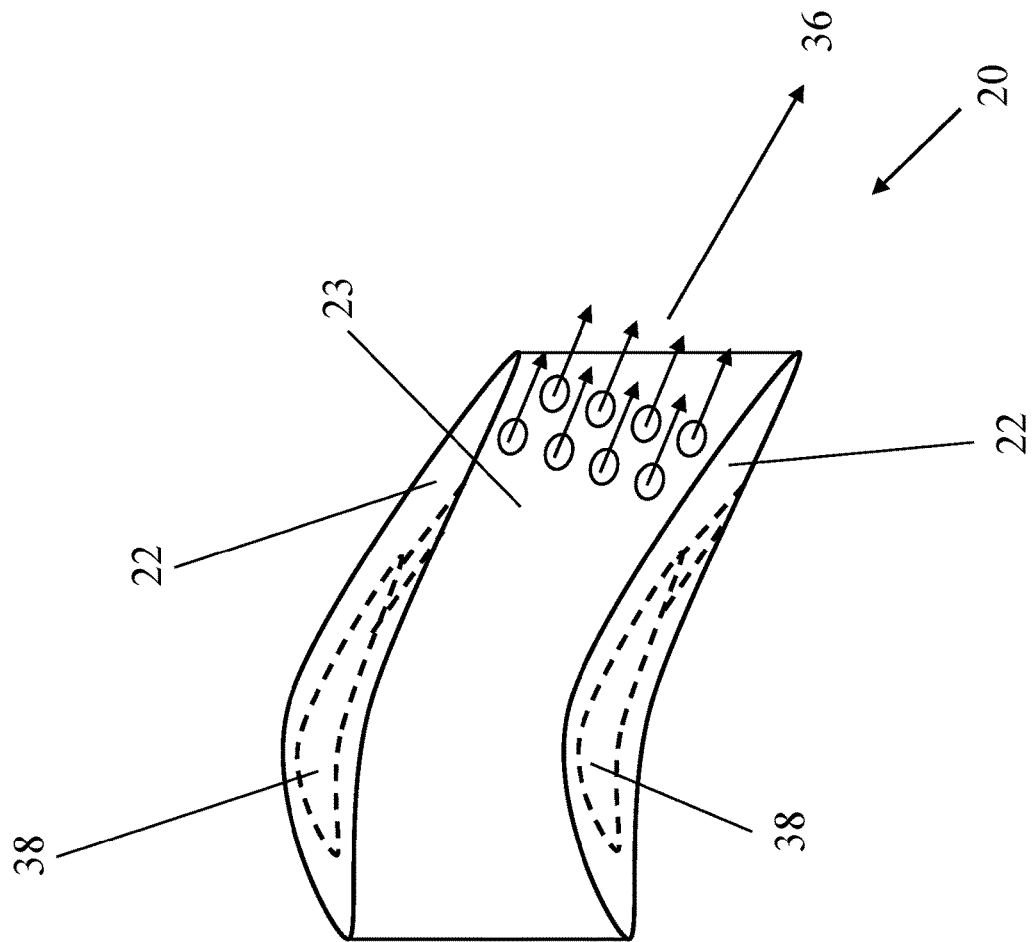
FIG. 3 shows a schematic representation of the stator passage of the turbine module in a meridional section.

FIG. 3 shows the stator passage of the turbine module in a meridional section. The inclined holes 37 are arranged in two rows axially, one behind the other. The flow in the cavity 30 is guided by the ribs 33 (shown as hatched lines in FIG. 2) and the inclined holes 37 in such a way, that the reinjected flow shows a circumferential velocity largely corresponding to that of the main flow 36, additionally, it is directed towards the pressure side of the stator airfoil 22. An air passage 38 extending through the stator airfoil 22 is shown by hatched lines, which channels a flow to the openings 32.2 in the stator airfoil 22.

REFERENCE LIST

Turbomachine 1
   Compressor section 1a
   Combustion chamber 1b
   Turbine section 1c
   Fan section 1d
Turbine module 2
Longitudinal axis 3
Stator vane 20
Rotor blade 21
Stator airfoil 22
Outer platform of the stator vane 23
   Inner wall surface of outer platform 23.1
   Outer wall surface of outer platform 23.2
Vane hooks 24
Inner wall surface of engine casing 25
Main channel 26
Additional flow into the cavity 29
Cavity 30
Inlet 31
   Opening of the Inlet 31.1
Outlet 32
   Opening of the Outlet 32.1, 32.2
Ribs in the cavity 33
Heat shield element 34
Additional inlet 35
Main flow 36
   Tip-Leakage flow 36.1
   A part of the main flow into the cavity 36.2
Inclined holes 37
Air passage through the stator airfoil 38

What is claimed is:

1. A turbine module for a turbomachine, the turbine module comprising: a main channel to guide a main flow through the turbine module; a rotor blade; a stator vane, the rotor blade adjacent to and directly upstream of the stator vane, the stator vane including a stator airfoil and a platform, the stator airfoil being arranged downstream of the rotor blade in the main channel; and a cavity including an inlet for injecting a part of the main flow into the cavity and an outlet for a reinjection of the part of the main flow from the cavity into the main channel, the cavity being arranged at an axial position of the stator vane and radially offset from the stator airfoil; wherein the part of the main flow guided into the cavity is a leakage flow of the rotor blade adjacent to and directly upstream of the stator vane; and wherein an opening of the inlet is arranged at an upstream end of the stator vane at the platform of the stator vane.

2. The turbine module as recited in claim 1, wherein an opening of the inlet is arranged at a wall surface radially delimiting the main channel.

3. The turbine module as recited in claim 2 wherein the wall surface is of the platform of the stator vane.

4. The turbine module as recited in claim 1 wherein the cavity is radially delimited by the platform.

5. The turbine blade as recited in claim 4 wherein the cavity is radially delimited by a wall surface of the platform radially opposite to another wall surface delimiting the main channel.

6. The turbine module as recited in claim 1 wherein an opening of the outlet is arranged at a minimum 20% of an axial chord length of the stator airfoil, the axial chord length being defined at a wall surface of the platform.

7. The turbine module as recited in claim 1 wherein an opening of the outlet is arranged at a maximum 99% of an axial chord length of the stator airfoil, the axial chord length being defined at a wall surface of the platform.

8. The turbine module as recited in claim 1 wherein the outlet includes inclined holes or slots for guiding the part of the main flow reinjected from the cavity into the main channel.

9. The turbine module as recited in claim 8 wherein a middle axis of at least one of the inclined holes or slots forms an angle of maximum 60° with a wall surface radially delimiting the main channel.

10. The turbine module as recited in claim 1 wherein an opening of the outlet is arranged in the stator airfoil.

11. The turbine module as recited in claim 1 further comprising a heat shield element arranged bordering the cavity, the heat shield element radially delimiting the cavity.

12. The turbine module as recited in claim 1 further comprising ribs for guiding the flow in the cavity and arranged in the cavity.

13. The turbine module as recited in claim 1 wherein the cavity includes an additional inlet for guiding an additional flow into the cavity, the additional flow being sourced externally outside the main flow.

14. A turbomachine comprising the turbine module as recited in claim 13.

15. A method for operating the turbomachine as recited in claim 14 wherein the part of the main flow is guided into the cavity and reinjected from the cavity into the main channel.

16. The turbine module as recited in claim 1 wherein the outlet is upstream of a trailing edge of the stator airfoil and is oriented to reinject the part of the main flow from the cavity onto a surface of the stator airfoil.

17. The turbine module as recited in claim 16 wherein the part of the main flow reinjected from the cavity has a circumferential velocity.

18. The turbine module as recited in claim 17 wherein the part of the main flow reinjected from the cavity is directed towards the pressure side of the stator airfoil.

19. The turbine module as recited in claim 18 further comprising ribs for guiding the flow in the cavity and arranged in the cavity.

* * * * *